INVENTORS
DAVID A. KERSH
IRVING KERSH

ATTORNEY

Jan. 4, 1966  D. A. KERSH ETAL  3,227,329
MEASURING DISPENSER FOR CARTONS AND THE LIKE
Filed Aug. 21, 1964  4 Sheets-Sheet 2

INVENTORS
DAVID A. KERSH
IRVING KERSH
BY
ATTORNEY

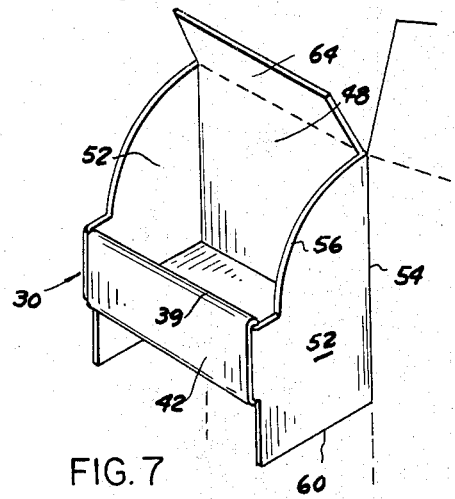
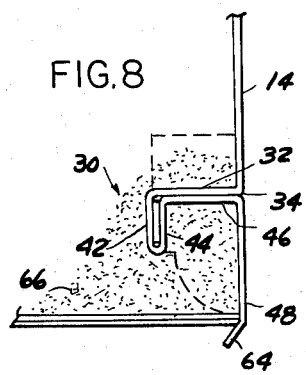
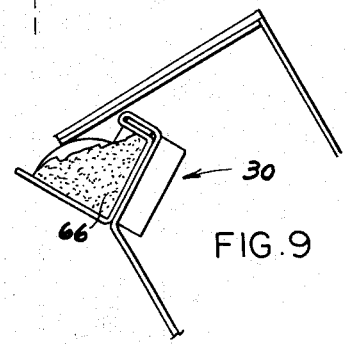
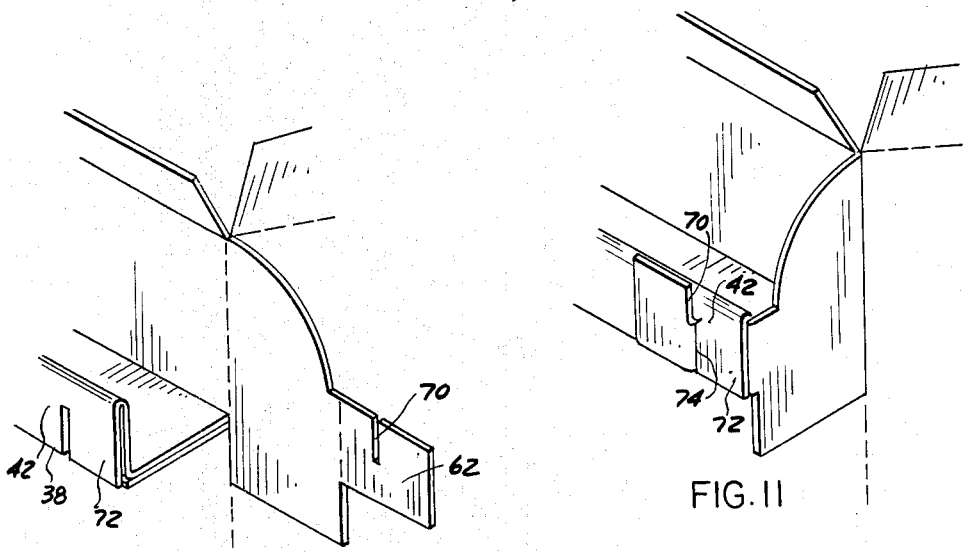
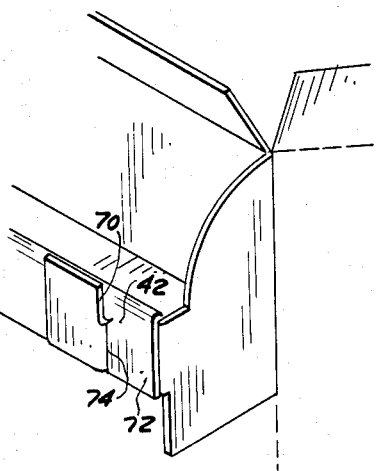

Jan. 4, 1966  D. A. KERSH ETAL  3,227,329
MEASURING DISPENSER FOR CARTONS AND THE LIKE
Filed Aug. 21, 1964  4 Sheets-Sheet 4

INVENTORS
DAVID A. KERSH
IRVING KERSH
BY
ATTORNEY

3,227,329
MEASURING DISPENSER FOR CARTONS AND THE LIKE

David A. Kersh and Irving Kersh, 18411 Greenlawn, Detroit, Mich.
Filed Aug. 21, 1964, Ser. No. 391,119
15 Claims. (Cl. 222—363)

This invention relates to containers, and more particularly has reference to a container having a measuring dispenser structure integral therewith, the container and dispenser being both formed of a single blank.

Certain free-flowing materials, such as detergents, sugar, flour and the like commonly made available in commercial form in cardboard containers are frequently, if not always, used in carefully measured quantities. To dispense the contents of the box, an opening is made at its upper end and the box tilted until the stored material flows exteriorly through the opening. However, with with this type of container it is extremely difficult to accurately control the volume of material actually dispensed; the container must be carefully shook, tapped or otherwise urged to dispense small quantities at a time in order to obtain precisely the desired amount.

Moreover, if the user cannot rely upon visual measurement of the amount dispensed, some type of supplementary measuring means, such as a measuring cup or other graduated utensil, must be employed. However, when these measuring devices are used, the container must still be tilted and carefully urged to dispense only enough material to fill the measuring device to the desired graduation; if an excessive amount pours into the device, it must be returned to the container or discarded. This technique is, therefore, inconvenient and burdensome to the user.

In response to this basic every-day problem numerous containers have heretofore been suggested having measuring dispensers formed integrally therewith. One such dispenser structure employs a cup-shaped member formed along the upper interior face of one of the container's end walls. The cup-shaped member is filled by inverting the container so that the stored material congregates directly below this member. The container is then righted, the cup being then filled with the material. A tab is then pulled, thereby moving the cup exteriorly of the container walls and exposing the stored material in the cup, which is then dispensed by tilting the container.

However, these dispensing structures have heretofore not been acceptable for commercial use. Many of these structures require the construction of the cup from a separate blank with subsequent gluing of the cup to the remainder of the container. Such steps are not feasible for modern large-scale production, where the entire forming and folding operation must be accomplished on high-speed automated equipment. Other containers of this type have been constructed completely of a single blank but have been found to be inadequate due to their tendency to leak while the cup member is in either its retracted or dispensing position. In order to make such dispensing containers acceptable for commercial use they have invariably required additional gluing, thereby excessively increasing the cost of the container.

It is, therefore, the primary object of the present invention to provide a measuring dispenser of the type described above, which is formed entirely of a single blank, and which forms a completely leak-proof container without any gluing of the pivoting dispenser structure.

Another object of the present invention is to provide a measuring dispenser of this kind which may be conveniently manufactured and assembled with available machinery and equipment.

Another object of the present invention is to provide a measuring dispenser of this kind which is formed entirely of a single blank, a portion of one such blank "nesting" in a portion of the adjacent blank, with a resulting savings in the quantity of container material required.

Still another object of the present invention is to provide a measuring dispenser of this kind which may be readily employed with a variety of different types of containers and stored flowable materials.

As will be shown and described subsequently in great detail with respect to a number of preferred embodiments, the present invention meets each of these objects and thereby provides a simple measuring and dispensing container which may be manufactured and assembled at very low cost, which is extremely efficient and convenient in operation, and which is readily adaptable for use with a wide variety of flowable materials and containers therefor.

Other objects and advantages will be more readily apparent from the following detailed description of several preferred embodiments of the present invention. The description makes reference to the drawings in which:

FIGURE 7 shows the structure of FIGURE 6 completely assembled;

FIGURE 8 is a fragmentary cross-sectional view showing the container inverted and the dispenser in closed position;

FIGURE 9 is a fragmentary cross-sectional view showing the dispenser in open position;

FIGURE 10 is a fragmentary perspective view of a modified form of the dispenser flaps and tabs with the dispenser partially assembled;

FIGURE 11 shows the dispenser of FIGURE 10 completely assembled;

Figure 1:
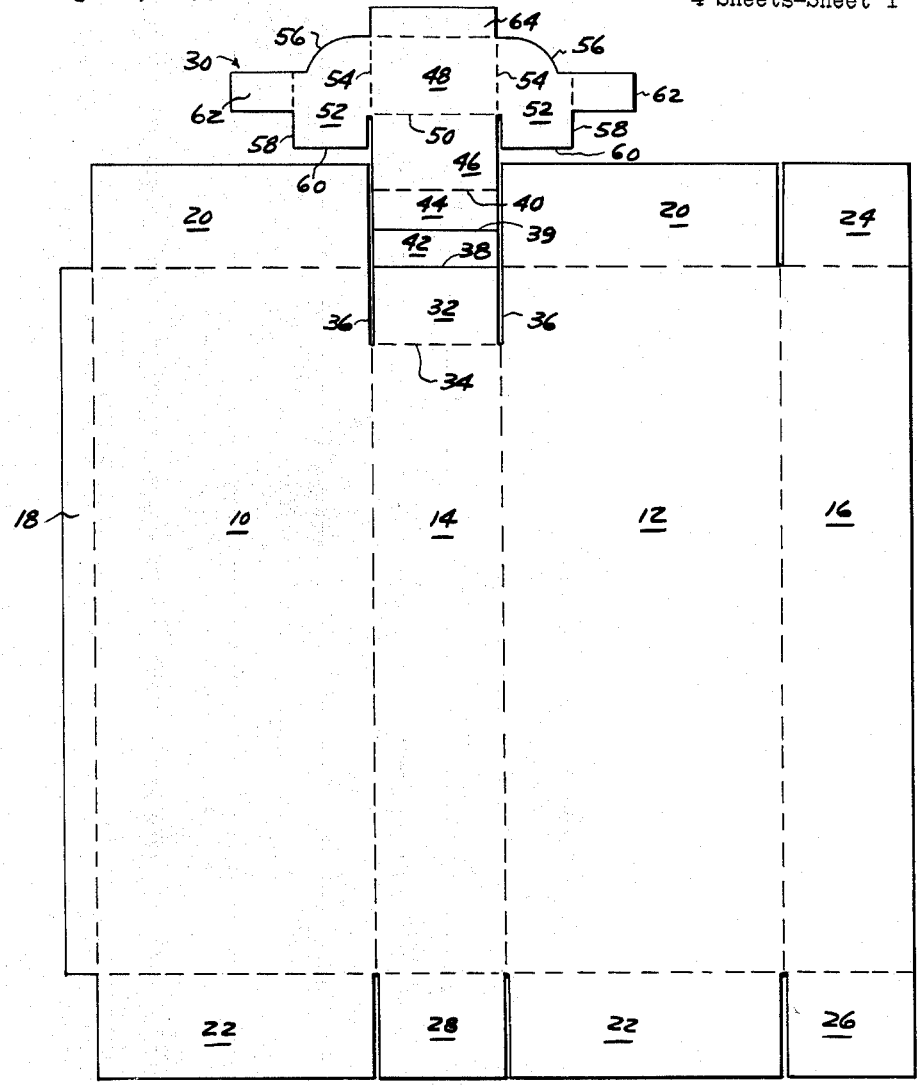
FIGURE 1 is a plan view of a blank of sheet material from which a first embodiment of the dispensing carton of the present invention is formed.

Referring to the drawings in detail, FIGURES 1–9 illustrate a first embodiment of the invention. FIGURE 1 shows a blank of cardboard or other suitable material, cut, scored, and shaped to form opposing side walls 10 and 12, end walls 14 and 16, and a narrow lapping flap 18. Closing flaps 20 and 22 are disposed respectively at the top and bottom of each side wall 10 and 12. One of the end walls 16 has top and bottom flaps 24 and 26, and the other end wall 14 has a bottom flap 28. A measuring dispenser, generally indicated at 30 and described below in greater detail, in integrally formed at the upper end of the end wall 14.

A first floor flap 32 is formed at the upper end of the end wall 14 by means of a transverse scored fold line 34, and a pair of spaced longitudinal cuts 36. The cuts 36 extend upwardly to the top edge of the upper closing flaps 20. Three additional parallel score lines, 38, 39 and 40, extend between the cuts 36 at spaced points to form hingedly connected first and second front flaps 42 and 44.

A second floor flap 46, equal in size to floor flap 32, is hingedly connected along score line 40 and projects above the upper edge of the top flaps 20. A back panel 48 is hingedly connected to the flap 46 along a transverse score line 50 and includes an upper hinged pull tab 64. A pair of side panels 52 are hingedly connected to the back panel 48 along longitudinal score lines 54 and each include an upper arcuate edge 56, a longitudinal edge 58, and a transverse edge 60 spaced slightly above the upper edge of the adjacent upper closing flap 20. A tab 62 is hingedly connected to each side panel 52 along the longitudinal edge 58. The side panel 52 is substantially equal in length to the height of the floor flap 32. Each tab 62 is slightly less than half as long as the width of the end wall 14.

Numerous methods of assembling the present container are possible. For example, the measuring dispenser 30 may be assembled prior to the remainder of the carton. The upper portion of the dispenser 30 is moved downwardly about the hinge line 39 until the second floor flap 46 abuts the first floor flap 32 in the plane extending perpendicularly to the end wall 14, and the first and second front flaps 42 and 44 abut, as can best be seen in FIGURES 4 and 6. The flaps 42 and 44 are bent upwardly at right angles, the side panels 52 bent rearwardly at right angles and the tabs 62 simultaneously inserted in the enclosure formed therebetween to form the completed measuring dispenser as can best be seen in FIGURE 7.

Figure 2:
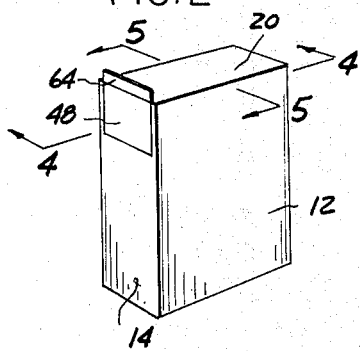
FIGURE 2 is a perspective view of a carton formed from the blank of FIGURE 1 in closed position.
Figure 3:
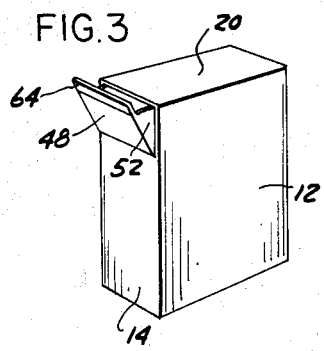
FIGURE 3 is a fragmentary perspective view of the carton of FIGURE 2 in open position.
Figure 4:
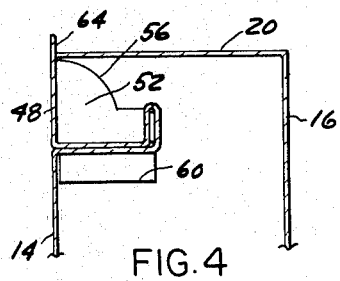
FIGURE 4 is a cross-sectional view taken along the lines 4—4 in FIGURE 2.
Figure 5:
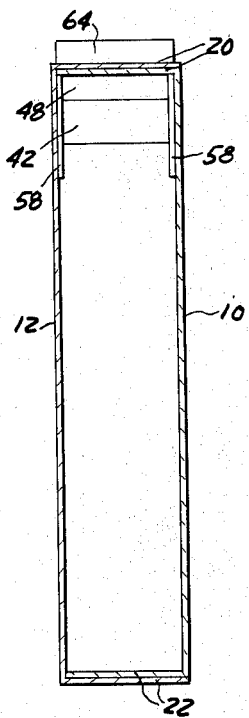
FIGURE 5 is a cross-sectional view taken along the lines 5—5 in FIGURE 2.
Figure 6:
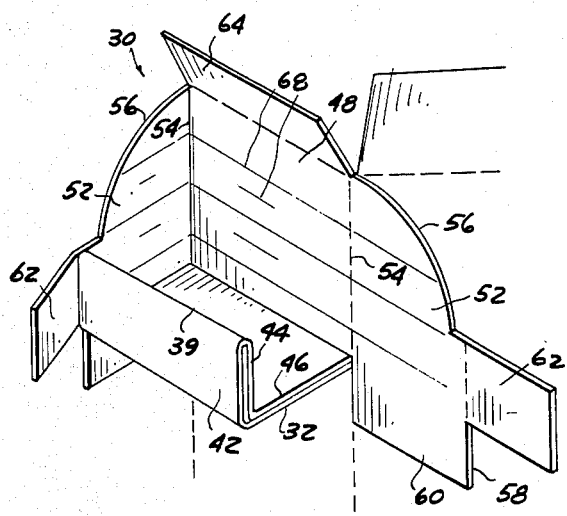
FIGURE 6 is a fragmentary perspective view of the dispensing structure of FIGURES 1–5 in partially-assembled form.

The side walls 10 and 12, end walls 14 and 16, lapping flap 18, closing flaps 20 and 22, and flaps 24, 26 and 28 are then folded along their respective score lines and adhesively secured together in known manner to form the rectangular box shown in FIGURES 2 and 3. The back panel 48 is then in vertical alignment with the end wall 14, the upper pull tab 64 of the dispenser 30 protruding above the upper surface of the folded box. The container is preferably transported and sold commercially with the pull tab 64 adhesively secured to the upper surface of the box top. When the box is to be used, the tab 64 is lifted off of the box top and pulled outwardly in the manner shown in FIGURE 3.

It can be seen that the above bending and gluing steps may be altered and various other sequences employed in accordance with the machinery used in assembly.

FIGURES 8 and 9 show how the container is used to dispense a measured quantity of material. The container is first inverted with the dispenser 30 in its retracted position, the flowable material 66 thereby falling around the dispenser as shown in FIGURE 8. If necessary, the container can be also tilted slightly from the vertical to ensure that the flowable material 66 falls directly below the dispenser 30. The container is then returned to its upright position, and the tab 64 pulled forwardly to bring the dispenser 30 into the inclined position of FIGURE 9. The upper corners of the longitudinal edges 58 will abut the lower surface of the top flaps 20 which serve as a stop to prevent the dispenser from being pulled too far forward about the hinge line 34. The container is then tilted or inverted to permit the material 66 to be dispensed.

The lower ends of the walls 52 project below the bottom flap 32 and normally abut the interior surface of the wall 14 so as to stiffly support the dispenser in upright closed position.

It can be seen that the dispenser 30 will always dispense the same measured quantity of material 66 provided that at least this minimum quantity is present in the container. If desired, the dispenser 30 can be provided with suitable volumetric graduations as at 68 to inform the user how much material is actually in the dispenser when less than the normally dispensed amount is present in the container. The size of the dispenser provided in the container will depend upon the type of flowable material to be dispensed and the normal or customary units employed in using the material, e.g. cups, pints, etc.

The construction of the measuring dispenser 30 prevents leakage of the flowable material 66 through the container whether the dispenser is in its forward or retracted position. Thus, after the container has been used once to dispense a portion of the stored material, it remains a substantially completely sealed container. When the dispenser is pulled out to dispense some of the stored material and the container inverted the material will be effectively sealed against escape through any of the cuts in the container due to the construction of the dispenser.

FIGURES 10 and 11 show a modified system for locking the tabs 62 in place. Each tab 62 includes a vertical cut 70 extending downwardly from its upper edge about one-half the height of the tab 62. The flap 42 is provided with a horizontal cut 72 at each end extending along the fold line 38 a distance equal to the spacing of cut 70 on the tab 62 from the end of the tab. The flap cut 72 terminates in an upwardly extending cut 74 equal in height substantially to the cut 70. The tab 62 is locked in place, as shown in FIGURE 11, by slipping the tab cut 70 into the flap cut 74. Alternatively, a horizontal slit might be provided in flap 42 to receive the tab 62.

Figure 12:
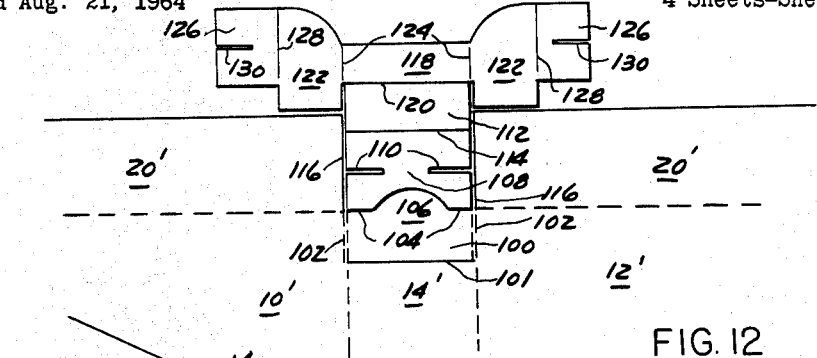
FIGURE 12 is a fragmentary plan view of a blank from which a second embodiment of the present container is formed.
Figure 13:
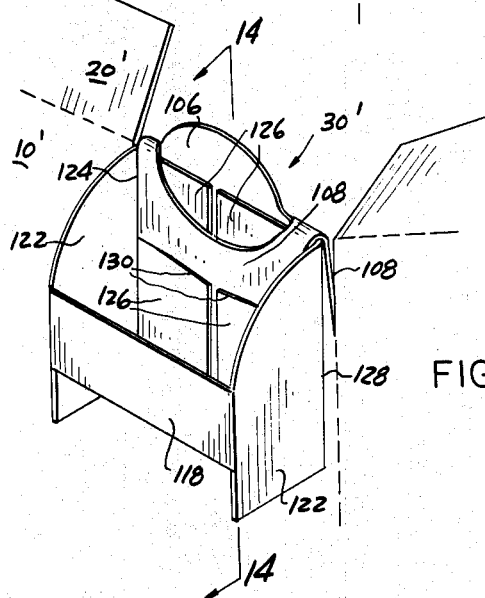
FIGURE 13 is a fragmentary perspective view of the dispenser formed from the blank of FIGURE 12.
Figure 14:
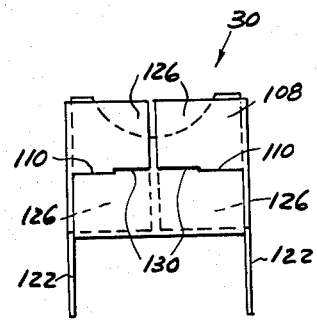
FIGURE 14 is a rear view of the dispenser taken substantially along the lines 14—14 of FIGURE 13.

FIGURES 12–14 show a modified dispenser structure 30$^1$. The container walls and flaps may be identical to those of FIGURES 1–9 and are assembled into position in the same manner. The dispenser 30$^1$ is joined to the upper end of the end wall 14$^1$, a first panel 100 in the end wall being connected by means of parallel lines of perforations 102 to the adjacent walls 10$^1$ and 12$^1$, by a hinge line 101 to the remainder of wall 14$^1$ and by a hinge line 104 to the remainder of the dispenser 30$^1$. A semicircular tab 106 is cut into a panel 108 connected along hinge line 104 to panel 100. The panel 108 includes a pair of transverse cuts 110 extending inwardly from opposite vertical edges of the panel. A floor flap 112 is connected along a hinge line 114 to the panel 108. Vertical cuts 116 separate the panel 108 and flap 112 from the adjacent closing flaps 20$^1$.

A rectangular front flap 118 is connected along a hinge line 120 to flap 112, and is hingedly connected to side flaps 122 along vertical hinge lines 124. The side flaps 122 are separated from flap 112 by the upper extension of the cuts 116 and are connected to lock flaps 126 along hinge lines 128. The flaps 126 have horizontally inwardly extending cuts 130 at their outer edges.

FIGURE 13 and 14 show the dispenser 30$^1$ in assembled position. To assemble the dispenser, the entire upper section 108–130 is pivoted downwardly about hinge line 104. The portions represented by numerals 112–130 are then pivoted upwardly about hinge line 114 to a position perpendicular to the plane of wall 14$^1$, and the portions 118–130 pivoted ninety degrees about hinge line 120 to bring these sections into a plane extending parallel to wall 14$^1$. The flaps 126 are bent through ninety degrees about hinge line 128, the flaps 122 and 126 are bent through ninety degrees about hinge line 124, and cut 130 inserted into locking engagement with the cuts 110 of panel 108. The tab 106 projects above the upper surface of the closed flaps 20$^1$.

When the container is to be used for the first time, the tab 106 is grasped and pulled downwardly and outwardly away from the container. This will tear the perforated lines 102 and thereby permit the entire formed dispenser 30$^1$ to pivot about the hinge line 101 in the same manner as dispenser 30 in FIGURES 1–9 pivots about hinge line 34. The dispenser 30$^1$ and its container are then used to dispense measured quantities of flowable material in the same manner as that of FIGURES 1–9. The abutment of the upper edge of flap 118 with the lower surface of closed flaps 20$^1$ serves as a stop in limiting the pivoting of the dispenser 30$^1$.

With respect to the blanks of both FIGURE 1 and FIGURE 12, it should be noted that they may be constructed in such manner as to permit "nesting" of the dispenser of one blank in the lower end of the next; this may be accomplished by properly forming the lower flaps 22 and 28 of the blank so that their areas need not be the full rectangular areas shown in FIGURE 1.

Various other modifications of the above embodiments are also contemplated. For example, in the embodiment of FIGURES 1–9, the first and second front flaps 42 and 44 may be eliminated, the tabs 62 eliminated, and the lower ends of the side panels 52 bent upwardly and shaped to fit between the two floor flaps 32 and 46. This will provide a three-walled cup member rather than the four-walled cup structure 30 of FIGURES 1–9. If desired, the cup 30 may be formed such that the floor flaps 32 and 46 normally slope at a slight angle from the horizontal and thereby more efficiently gather and retain the container's free-flowing material.

The dispenser shown in the foregoing embodiments can also be used to dispense a continuous flow of material from the container. This is accomplished by moving the cup member to a position intermediate its fully open and closed positions, and inverting the container.

In each of the above embodiments, the shape of the front wall of the cup member may be shaped as desired. For example, the front wall may be formed to create a spout to facilitate pouring of the container's contents.

It is to be understood that the present measuring dispenser can also be used in structures other than cardboard containers. For example the cup member of any of the embodiments shown herewith might be constructed to move in and out through the opening in the metal or plastic cap on a conventional jar. In such a modification the dispenser may be formed in an insert of plastic, cardboard or other suitable material adapted to seat on the jar below the cap. The cup member then pivots vertically between positions respectively below and above the cap.

It will be apparent to those skilled in the art to which this invention pertains that a variety of changes and modifications may be made without departing from the spirit of the invention or the scope of the related claims.

We claim:

1. In a container having at least one vertical end wall and a horizontal upper closing flap secured at the upper end of said end wall, a measuring dispenser structure formed integrally of the same blank as said container, comprising:
    (a) a vertical back portion disposed substantially in the plane of said wall;
    (b) a floor portion extending horizontally from the lower edge of said back portion in the direction away from said end wall;
    (c) vertical side portions joining the edges of said back and floor portions;
    (d) a vertical front portion joining said floor and side portions and thereby forming, with each of the aforesaid portions, a cup-shaped member enclosed on all four sides and at its bottom;
    (e) said cup-shaped member being pivotable in the vertical plane with respect to said end wall to a position exteriorly of said container; and
    (f) tab means on said cup-shaped member normally disposed exteriorly of said container and adapted, when pulled, to move said member to said exterior position.

2. The container as set forth in claim 1 and wherein said side portions are arcuate along their upper edges, and the upper edge of said front portion abuts the lower surface of said closing flap when said member is pivoted exteriorly of the container.

3. The container as set forth in claim 1 and wherein said side portions extend below said floor portion, the rear edges of said extending side portions abutting the interior face of said end wall.

4. In a container having at least one vertical end wall and a horizontal upper closing flap secured at the upper end of said end wall, a measuring dispenser structure formed integrally of the same blank as said container, comprising:
    (a) a floor portion extending horizontally from said end wall towards the interior of said container, said floor being formed of a double wall portion folded upon itself;
    (b) a vertical front portion formed by folding the end of said double wall portion upwardly at right angles;
    (c) a vertical back portion hingedly connected to said floor portion and disposed in the plane of said end wall;
    (d) side portions connecting said front, back and floor portions to form a cup-shaped member pivotable about said hinged connection between said back and floor portions so as to rotate between a normal position within said container to a position exterior of said container for dispensing of the contents of said cup-shaped member; and
    (e) tab means on said cup-shaped member exterior of said container adapted, when pulled, to pivot said member to said exterior position.

5. The container as defined in claim 4 and wherein said side portions are hingedly connected to said back portion, and including integral means for locking said side portions to said front portion.

6. The container as defined in claim 5 and wherein said locking means comprises tabs hingedly connected to said side portions and adapted to fit between the double walls of said front portion.

7. The structure as defined in claim 5 and wherein said locking means comprises tabs hingedly connected to said side portions, and interlocking cuts on said tabs and said front portion.

8. The structure as defined in claim 4 and wherein said side portions are arcuate along their upper edges and the upper edge of said front portion abuts the lower surface of said closing flap when said member is pivoted exteriorly of the container.

9. The container as set forth in claim 4 and wherein said side portions extend below said floor portion, the rear edges of said extending side portions abutting the interior face of said end wall.

10. In a container having at least one vertical end wall and a horizontal upper closing flap secured at the upper end of said end wall, a measuring dispenser structure formed integrally of the same blank as said container, comprising:
    (a) a vertical back portion formed of a double wall portion folded upon itself and hingedly connected to said end wall;
    (b) a horizontal floor portion hingedly connected to said back portion and extending toward the interior of said container;
    (c) a vertical front portion hingedly connected to said floor portion;
    (d) side portions hingedly connected to said front portion;
    (e) means locking said side portions to said back portion and to thereby form a cup-shaped member pivotable about the hinged connection between said back portion and said end wall, said member being rotatable between a normal position within said container to a position exterior of said container for dispensing of the contents of said cup-shaped member; and
    (f) tab means on said cup-shaped member exterior of said container, adapted, when pulled, to pivot said member to said exterior position.

11. The container as defined in claim 10 and wherein said locking means comprises flaps hingedly connected to said side portions and interlocking cuts on said last flaps and said back portion.

12. The structure as defined in claim 10 and wherein said side portions are arcuate along their upper edges and the upper edge of said front portion abuts the lower surface of said closing flap when said member is pivoted exteriorly of the container.

13. The container as set forth in claim 10 and wherein said side portions extend below said floor portion, the rear edges of said extending side portions abutting the interior face of said end wall.

14. In a container having at least one vertical end wall and a horizontal upper closing flap secured at the upper end of said end wall, a measuring dispenser structure formed integrally of the same blank as said container, comprising:
 (a) a vertical back portion disposed substantially in the plane of said wall;
 (b) a floor portion extending horizontally from the lower edge of said back portion in the direction away from said end wall;
 (c) vertical side portions having upper arcuate edges, said side portions joining the edges of said back and floor portions and thereby forming with said portions a cup-shaped member, said side portions locking with said floor portion;
 (d) said cup-shaped member being pivotable in the vertical plane with respect to said end wall to a position exteriorly of said container; and
 (e) tab means on said cup-shaped member normally disposed exteriorly of said container and adapted, when pulled, to move said member to said exterior position.

15. In a container having at least one wall abutting the material stored therein, a measuring dispenser structure, comprising:
 (a) a back portion disposed substantially in the plane of said wall;
 (b) a floor portion projecting from the edge of said back portion in the direction away from said wall;
 (c) side portions having upper arcuate edges, said side portions joining the edges of said back and floor portions and thereby forming with said back and floor portions a cup-shaped member;
 (d) said cup-shaped member being pivotable with respect to said end wall to a position exteriorly of said container; and
 (e) tab means on said cup-shaped member normally disposed exteriorly of said container and adapted, when pulled, to move said member to said exterior position,
 (f) said back, floor and side portions and said tab means being formed integrally of the same blank as said container.

References Cited by the Examiner
UNITED STATES PATENTS

| 2,613,856 | 10/1952 | Ely. | |
| 2,684,792 | 7/1954 | Kraus | 222—457 |
| 2,886,232 | 5/1959 | Leone | 222—457 X |
| 2,907,512 | 10/1959 | Leone | 222—457 X |
| 2,943,769 | 7/1960 | Klausmann et al. | 222—531 X |

M. HENSON WOOD, JR., *Primary Examiner.*

LOUIS J. DEMBO, *Examiner.*